United States Patent
Ohkura et al.

(10) Patent No.: US 10,858,466 B2
(45) Date of Patent: Dec. 8, 2020

(54) CURABLE COMPOSITION, COATING MATERIAL, ELECTRIC WIRE, AND RESIN ARTICLE

(71) Applicant: AGC Inc., Chiyoda-ku (JP)

(72) Inventors: Masahiro Ohkura, Chiyoda-ku (JP); Norihide Sugiyama, Chiyoda-ku (JP); Takeshi Eriguchi, Chiyoda-ku (JP)

(73) Assignee: AGC Inc., Chiyoda-ku (JP)

( * ) Notice: Subject to any disclaimer, the term of this patent is extended or adjusted under 35 U.S.C. 154(b) by 0 days.

(21) Appl. No.: 16/451,243

(22) Filed: Jun. 25, 2019

(65) Prior Publication Data

US 2019/0309111 A1 Oct. 10, 2019

Related U.S. Application Data

(63) Continuation of application No. PCT/JP2018/005276, filed on Feb. 15, 2018.

(30) Foreign Application Priority Data

Mar. 6, 2017 (JP) .................................. 2017-041256

(51) Int. Cl.

| | |
|---|---|
| *C08F 216/14* | (2006.01) |
| *C08K 5/29* | (2006.01) |
| *C08F 214/18* | (2006.01) |
| *C08F 214/26* | (2006.01) |
| *C08L 27/14* | (2006.01) |
| *B32B 27/30* | (2006.01) |
| *C08L 27/12* | (2006.01) |
| *H01B 7/02* | (2006.01) |
| *C08K 5/16* | (2006.01) |
| *C08F 14/18* | (2006.01) |
| *H01B 3/44* | (2006.01) |
| *C08J 7/04* | (2020.01) |
| *C09D 127/12* | (2006.01) |
| *B32B 27/14* | (2006.01) |

(52) U.S. Cl.
CPC .......... *C08F 214/184* (2013.01); *B32B 27/30* (2013.01); *C08F 14/18* (2013.01); *C08F 214/262* (2013.01); *C08F 216/1408* (2013.01); *C08J 7/04* (2013.01); *C08K 5/16* (2013.01); *C08K 5/29* (2013.01); *C08L 27/12* (2013.01); *C08L 27/14* (2013.01); *C09D 127/12* (2013.01); *H01B 3/44* (2013.01); *H01B 7/02* (2013.01); *C08L 2203/16* (2013.01); *C08L 2203/202* (2013.01)

(58) Field of Classification Search
CPC ..................................................... C08F 216/14
USPC ....................................................... 528/247
See application file for complete search history.

(56) References Cited

U.S. PATENT DOCUMENTS

2016/0280865 A1  9/2016  Sugiyama et al.

FOREIGN PATENT DOCUMENTS

| WO | WO 2009/096342 A1 | 8/2009 |
| WO | WO 2015/098773 A1 | 7/2015 |
| WO | WO 2017/038718 A1 | 3/2017 |
| WO | WO 2018/159307 A1 | 9/2018 |

OTHER PUBLICATIONS

U.S. Appl. No. 15/176,408, filed Jun. 8, 2019, US 2016-0280865 A1, Sugiyama, N., et al.
U.S. Appl. No. 15/890,873, filed Feb. 7, 2018, US 2018-0162974 A1, Sugiyamam N., et al.
U.S. Appl. No. 16/267,407, filed Feb. 5, 2019, US 2019-0169326 A1, Sugiyama, N., et al.
U.S. Appl. No. 16/452,610, filed Jun. 26, 2019, Ohkura, M., et al.
International Search Report dated May 22, 2018 in PCT/JP2018/005276 filed Feb. 15, 2018.

*Primary Examiner* — Duc Truong
(74) *Attorney, Agent, or Firm* — Oblon, McClelland, Maier & Neustadt, L.L.P.

(57) ABSTRACT

A curable composition capable of being cured at a low temperature of from room temperature to 150° C. is provided. The curable composition comprises a fluorinated polymer containing at least three functional groups represented by the following formula (F) and at least one curing agent selected from the group consisting of an isocyanate-type curing agent, a blocked isocyanate-type curing agent and an amino resin-type curing agent:

$$-R^{f1}COZ^1 \qquad (F)$$

(in the formula (1), $R^{f1}$ is a fluoroalkylene group, or a fluoroalkylene group with at least two carbon atoms having an etheric oxygen atom between carbon-carbon atoms, $Z^1$ is $NR^1NR^2H$ or $NR^3OR^4$, and $R^1$, $R^2$, $R^3$ and $R^4$ are each independently a hydrogen atom or an alkyl group.)

11 Claims, No Drawings

CURABLE COMPOSITION, COATING MATERIAL, ELECTRIC WIRE, AND RESIN ARTICLE

TECHNICAL FIELD

The present invention relates to a curable composition, and a coating material, electric wire and resin article using the same.

BACKGROUND ART

Fluorinated polymers are used as various industrial materials, since they have excellent properties such as heat resistance, chemical resistance, low surface energy, low refractive index and low dielectric constant. Since the size of a fluorine atom is small next to a hydrogen atom, a fluorinated polymer having a chemical structure in which a hydrogen atom of a C—H bond is substituted by a fluorine atom to form a C—F bond, is produced. In particular, a perfluoropolymer in which all C—H bonds have been substituted by C—F bonds, for example, a polytetrafluoroethylene (PTFE) which corresponds to a substituted polyethylene, has characteristic physical properties that are not present in other materials, whether organic or inorganic, in the above properties.

As a perfluoropolymer which is curable by heat or light to obtain a cured product excellent in heat resistance and light resistance, for example, a liquid curable fluorinated polymer having $CF_2$=CFO— (perfluorovinyloxy) groups (see e.g. Patent Document 1) or a curable fluorinated polymer having C=O (carbonyl) groups (see e.g. Patent Document 2) has been proposed.

PRIOR ART DOCUMENTS

Patent Documents

Patent Document 1: WO2009/096342
Patent Document 2: WO2015/098773

DISCLOSURE OF INVENTION

Technical Problem

However, in order to cure the fluorinated polymer described in Patent Document 1 or Patent Document 2, heating or active energy rays such as ultraviolet rays at a high temperature of over 150° C. were necessary. It is an object of the present invention to provide a curable composition which is curable at a low temperature of from room temperature to 150° C.

Solution to Problem

The present invention provides a curable composition, an electric wire and a resin article having the following constructions [1] to [11].

[1] A curable composition characterized by comprising a fluorinated polymer containing at least three functional groups represented by the following formula (F), and at least one curing agent selected from the group consisting of an isocyanate-type curing agent, a blocked isocyanate-type curing agent and an amino resin-type curing agent:

—$R^{f1}COZ^1$            (F)

(in the formula (F), $R^{f1}$ is a fluoroalkylene group, or a fluoroalkylene group with at least two carbon atoms having an etheric oxygen atom between carbon-carbon atoms, $Z^1$ is $NR^1NR^2H$ or $NR^3OR^4$, and $R^1$, $R^2$, $R^3$ and $R^4$ are each independently a hydrogen atom or an alkyl group.)

[2] The curable composition according to [1], wherein the fluorinated polymer contains a unit represented by the following formula (U1), and contains at least one functional group represented by the formula (F) in the unit represented by the formula (U1):

(U1)

(in the formula (U1), $X^1$ and $X^2$ are each independently a hydrogen atom or a fluorine atom, $Q^1$ is a single bond or an etheric oxygen atom, $R^{f1}$ is a fluoroalkylene group, or a fluoroalkylene group with at least two carbon atoms having an etheric oxygen atom between carbon-carbon atoms, $Z^1$ is $NR^1NR^2H$ or $NR^3OR^4$, and $R^1$, $R^2$, $R^3$ and $R^4$ are each independently a hydrogen atom or an alkyl group.)

[3] The curable composition according to [2], wherein the fluorinated polymer contains at least three units represented by the formula (U1).

[4] The curable composition according to [1], wherein the fluorinated polymer contains at least three groups represented by the following formula (F1).

(F1)

(in the formula (F1), $R^{f2}$ is a $C_{1-4}$ perfluoroalkylene group; k is an integer of from 1 to 200; $R^{f1}$ is a fluoroalkylene group, or a fluoroalkylene group with at least two carbon atoms having an etheric oxygen atom between carbon-carbon atoms; $Z^1$ is $NR^1NR^2H$ or $NR^3OR^4$; and $R^1$, $R^2$, $R^3$ and $R^4$ are each independently a hydrogen atom or an alkyl group.)

[5] The curable composition according to [4], wherein the fluorinated polymer is a compound in which three or four groups represented by the formula (F1) are bonded to one carbon atom.

[6] The curable composition according to any one of [1] to [5], wherein the amount of fluorine atoms contained in the fluorinated polymer is from 50 to 76 mass %.

[7] The curable composition according to any one of [1] to [6], wherein the content of the curing agent is from 0.1 to 100 parts by mass to 100 parts by mass of the fluorinated polymer.

[8] A coating material comprising the curable composition as defined in any one of [1] to [7] and a liquid having a boiling point of at most 250° C.

[9] An electric wire comprising a conductor wire and a covering layer covering the outer periphery of the conductor wire, wherein the covering layer is made of a cured product of the curable composition as defined in any one of [1] to [7].

[10] A resin article comprising a resin substrate and a covering layer covering the surface of the resin substrate, wherein the covering layer is made of a cured product of the curable composition as defined in any one of [1] to [7].

[11] The resin article according to [10], wherein the resin substrate is a transparent polyester, an epoxy resin, a transparent silicone resin, a polyurethane resin, a silicone rubber, a polyurethane rubber, or a fluororubber.

Advantageous Effects of Invention

According to the present invention, it is possible to provide a curable composition which is curable at a low temperature of from room temperature to 150° C.

According to the present invention, it is possible to provide a coating material, electric wire and resin article using the curable composition which is curable at a low temperature of from room temperature to 150° C.

DESCRIPTION OF EMBODIMENTS

[Meanings of Terms in this Specification]

A compound represented by the formula (a) may be sometimes referred to as a compound (a). Compounds represented by other formulae may be also referred to in the same manner. A unit represented by the formula (b) may be sometimes referred to as a unit (b). Units represented by other formulae may be also referred to in the same manner.

A "unit" in a polymer means a moiety derived from a monomer to be formed by polymerization of the monomer. A unit derived from a monomer may be also referred to simply as a "monomer unit".

A "fluoroethylene" means a compound having from 0 to 3 fluorine atoms in tetrafluoroethylene ($CF_2=CF_2$) substituted by hydrogen atom(s) or halogen atom(s) other than fluorine (e.g. chlorine, bromine or iodine).

A group having a carbon atom chain, such as an alkyl group, a fluoroalkyl group, a fluoroalkylene group, a fluoroalkoxy group, a fluoroalkenyl group, etc., may be linear or branched.

A "fluoroalkyl group" means a group in which at least one of hydrogen atoms in an alkyl group is substituted by a fluorine atom. The proportion of fluorine atoms in a fluoroalkyl group is preferably at least 50%, particularly preferably 100%, i.e. a perfluoroalkyl group, when expressed by (the number of fluorine atoms in a fluoroalkyl group)/(the number of hydrogen atoms in an alkyl group having the same number of carbon atoms as the fluoroalkyl group)× 100(%). The same applies to a fluoroalkylene group, a fluoroalkoxy group and a fluoroalkenyl group, and a perfluoroalkylene group, a perfluoroalkoxy group and a perfluoroalkenyl group are preferred.

"Curing" means curing by crosslinking, unless otherwise stated.

[Curable Composition]

The curable composition of the present embodiment comprises a fluorinated polymer (hereinafter referred to as a "fluorinated polymer (A)") containing at least three functional groups represented by the following formula (F) (hereinafter referred to as "groups (F)"), and at least one curing agent (hereinafter referred to as a "curing agent (B)") selected from the group consisting of an isocyanate-type curing agent, a blocked isocyanate-type curing agent and an amino resin-type curing agent.

$$-R^{f1}COZ^1 \quad (F)$$

In the formula (F), $R^{f1}$ is a fluoroalkylene group, or a fluoroalkylene group with at least two carbon atoms having an etheric oxygen atom between carbon-carbon atoms, $Z^1$ is $NR^1NR^2H$ or $NR^3OR^4$, and $R^1$, $R^2$, $R^3$, and $R^4$ are each independently a hydrogen atom or an alkyl group.

In the curable composition of the present embodiment, a $-COZ^1$ group in the fluorinated polymer (A) and the curing agent (B) react to form a cross-linked structure, which contributes to curing of the curable composition.

In the curable composition of the present embodiment, it is assumed that in the case of the fluorinated polymer (A) wherein $Z^1$ in groups (F) is $NR^1NR^2H$, by heating at a level of room temperature or at most 150° C., two groups (F) will form a urea bond with the curing agent (B) and thus will be crosslinked. Further, there is a possibility that a dehydration reaction may proceed as described in Chemistry of Heterocyclic Compounds (2016, Vol. 52, No. 2, pp. 133-139) to form 1,3,4-oxadiazole rings. There is also a possibility that a low molecular component is eliminated from the periphery of the urea bond once formed as described above, and a high molecular component remaining at the place where the low molecular component is eliminated, will be crosslinked by a new bond.

In a case where $Z^1$ in groups (F) is $NR^3OR^4$, the fluorinated polymer (A) is considered to be crosslinked when two groups (F) form either one or both of a urethane bond and a urea bond with the curing agent (B) by heating at a level of room temperature or at most 150° C.

Here, in the crosslinking reaction, some or all of $-COZ^1$ in the fluorinated polymer (A) may be reacted. $-COZ^1$ not consumed in the crosslinking reaction may be used for another reaction such as a coupling reaction between groups (F) during or after the crosslinking reaction.

The curable composition may consist only of the fluorinated polymer (A) and the curing agent (B), or may contain reactive components (hereinafter referred to also as "other reactive components") other than the fluorinated polymer (A) and the curing agent (B) to such an extent that the above-mentioned crosslinking reaction between the fluorinated polymer (A) and the curing agent (B) will not be impaired. Other reactive components may be a fluorinated polymer having one or two groups (F), a silane coupling agent for improving the adhesion to a conductor wire or a resin substrate, etc. The curable composition may further contain a non-reactive component. Hereinafter, each component contained in the curable composition will be described.

(Fluorinated Polymer (A))

The fluorinated polymer (A) contains at least three groups (F) per molecule.

In a group (F), when $R^{f1}$ is a fluoroalkylene group, its number of carbon atoms is preferably from 1 to 6, particularly preferably from 1 to 4. When the number of carbon atoms is at least 3, a linear chain structure is preferred from the viewpoint of excellent thermal stability. The fluoroalkylene group is preferably a perfluoroalkylene group from the viewpoint of excellent thermal stability. That is, as $R^{f1}$, a $C_{1-6}$ perfluoroalkylene group is preferred, and a $C_{1-4}$ perfluoroalkylene group is particularly preferred.

In a group (F), when $R^{f1}$ is a fluoroalkylene group having at least two carbon atoms having an etheric oxygen atom between carbon-carbon atoms, its number of carbon atoms is preferably from 2 to 10, particularly preferably from 2 to 6. When the number of carbon atoms is at least 3, a linear chain structure is preferred from the viewpoint of excellent thermal stability. The fluoroalkylene group is preferably a perfluoroalkylene group from the viewpoint of excellent thermal stability. That is, as $R^{f1}$, a $C_{2-10}$ perfluoroalkylene group having an etheric oxygen atom between carbon-carbon atoms is preferred, and a $C_{2-6}$ perfluoroalkylene group having an etheric oxygen atom between carbon-carbon atoms is particularly preferred.

As $R^{f1}$, specifically, $CF_2$, $(CF_2)_2$, $(CF_2)_3$, $(CF_2)_4$, $CF_2CF(CF_3)O(CF_2)_2$, $CF_2CF(CF_3)O(CF_2)_3$, $(CF_2)_3O(CF_2)_2$, $(CF_2)_2O(CF_2)_2$, $CF_2OCF(CF_3)$, $CF_2OCF(CF_3)CF_2OCF(CF_3)$, etc. are preferred.

$R^1$, $R^2$, $R^3$ and $R^4$ are each preferably a hydrogen atom or a $C_{1-6}$ alkyl group, more preferably a hydrogen atom or a $C_{1\ or\ 2}$ alkyl group, further preferably a methyl group or a hydrogen atom, particularly preferably a hydrogen atom, from the viewpoint of excellent adhesion between the covering layer obtainable by curing the curable composition of the present embodiment and the substrate.

As $-COZ^1$, specifically, $-CONHNH_2$, $-CON(CH_3)NHCH_{(3)}$, $-CONHOH$, $-CONHOCH_3$, etc. are preferred.

The number of groups (F) in a fluorinated polymer (A) is at least 3, preferably from 3 to 100, more preferably from 3 to 30. The structures of at least three groups (F) in the fluorinated polymer (A) may be different from each other or may be the same. It is possible to appropriately select a combination of groups (F) having predetermined structures according to the characteristics required for the curable composition.

Since $Z^1$ in a group (F) is $NR^1NR^2H$ or $NR^3OR^4$, the fluorinated polymer (A) has an advantage of being soluble in an alcohol, even in the case of a fluorinated polymer (A) having a high fluorine atom content, like a perfluoropolymer.

As the alcohol which dissolves the fluorinated polymer (A), methanol, ethanol, n-propanol, isopropanol, n-butanol, isobutanol, tert-butanol, methoxyethanol, methoxypropanol, etc. may be mentioned, and methanol and ethanol are preferred.

When the solubility in an alcohol is required for the fluorinated polymer (A), by adjusting the structure or proportion of groups (F) in the fluorinated polymer (A), it is possible to obtain, for example, a fluorinated polymer (A) having a dissolution amount of at least 2 mass % to the total of the alcohol (preferably methanol) and the fluorinated polymer (A) at room temperature (25° C.). The dissolution amount of the fluorinated polymer (A) in the alcohol is preferably at least 3 mass %, more preferably at least 4 mass %, further preferably at least 5 mass %.

The content of fluorine atoms in the fluorinated polymer (A) is preferably from 50 to 76 mass %. The content of fluorine atoms being at least 50 mass % is preferred from the viewpoint of excellent flame retardancy, and being at most 76 mass % is preferred from the viewpoint of excellent moldability. The content of fluorine atoms is more preferably from 55 to 65 mass %. The content of the fluorine atoms can be calculated using the number of fluorine atoms measured by $^{19}F$-NMR measurements.

The fluorinated polymer (A) may have groups (F) on side chains of the monomer units or at molecular terminals of the fluorinated polymer (A) so long as the total number of groups (F) is at least 3. When it has groups (F) on side chains of the monomer units, it is preferred that the groups (F) are bonded to the main chains of the monomer units through a single bond or an etheric oxygen atom.

As the monomer unit containing a group (F), a unit represented by the following formula (U1) (hereinafter referred to as a "unit (U1)") is preferred.

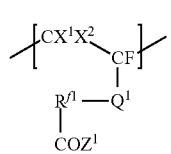
(U1)

In the formula (U1), $X^1$ and $X^2$ are each independently a hydrogen atom or a fluorine atom, and $Q^1$ is a single bond or an etheric oxygen atom. $-R^{f1}COZ^1$ in the formula (U1) corresponds to a group (F).

When the fluorinated polymer (A) has a group (F) at its molecular terminal, the group (F) is preferably a functional group represented by the following formula (F1) (hereinafter referred to as a "group (F1)"), a functional group represented by the following formula (F11) (hereinafter referred to as a "group (F11)"), a functional group represented by the following formula (F12) (hereinafter referred to as a "group (F12)"), etc. Further, as the case requires, the group (F1), the group (F11), the group (F12), etc. may be present on side chains of the monomer units.

$$-(R^{f2}O)_k-R^{f1}COZ^1 \quad (F1)$$

In the formula (F1), $R^{f2}$ is a $C_{1-4}$ perfluoroalkylene group. k is an integer of from 1 to 200. $-R^{f1}COZ^1$ corresponds to a group (F).

$$-CF_2COZ^1 \quad (F11)$$

$$-CF_2CF_2COZ^1 \quad (F12)$$

The types and examples of $Z^1$ in the formulae (F11) and (F12) are as described above.

The fluorinated polymer (A) may be, for example, a fluorinated polymer (A) having at least three in total of units (U1) and groups (F1). Specifically a fluorinated polymer (A) having two groups (F1) at molecular terminals and having one or more units (U1), a fluorinated polymer (A) having one group (F1) at a molecular terminal and having two or more units (U1), etc. may be mentioned. Further, in the above case, the fluorinated polymer (A) may have a group (F11), a group (F12) or the like instead of the group (F1) as the group (F) at the molecular terminal.

The fluorinated polymer (A) is preferably a fluorinated polymer having at least three units (U1) (hereinafter referred to also as a "fluorinated polymer (A1)"), a fluorinated polymer having at least three groups (F1) (hereinafter referred to also as a "fluorinated polymer (A2)"), or the like.

<Fluorinated Polymer (A1)>

The fluorinated polymer (A1) may consist only of units (U1) and may consist of units (U1) and units other than units (U1). Hereinafter, each unit constituting the fluorinated polymer (A1) will be described.

In a unit (U1), $Q^1$ is preferably an etheric oxygen atom. $X^1$ and $X^2$ are each preferably a fluorine atom or a hydrogen atom, more preferably a hydrogen atom.

As specific examples of the unit (U1), the following units may be mentioned.
—[$CF_2$—$CF(O(CF_2)_2$—$COZ^1)$]—,
—[$CF_2$—$CF(O(CF_2)_3$—$COZ^1)$]—,
—[$CF_2$—$CF(O(CF_2)_4$—$COZ^1)$]—,
—[$CF_2$—$CF(OCF_2CF(CF_3)O(CF_2)_2$—$COZ^1)$]—,
—[$CF_2$—$CF(OCF_2CF(CF_3)O(CF_2)_3$—$COZ^1)$]—,
—[$CF_2$—$CF(O(CF_2)_3O(CF_2)_2$—$COZ^1)$]—,
—[$CF_2$—$CF(O(CF_2)_2O(CF_2)_2$—$COZ^1)$]—,
—[$CH_2$—$CF(CF_2OCF(CF_3)$—$COZ^1)$]—,
—[$CH_2$—$CF(CF_2OCF(CF_3)CF_2OCF(CF_3)$—$COZ^1)$]—.

In the above formulae, $Z^1$ is $-NHNH_2$, $-N(CH_3)NHCH_3$, $-NHOH$ or $-NHOCH_3$.

From the viewpoint of ease of availability, the unit (U1) is particularly preferably —[$CF_2$—$CF(O(CF_2)_3CONHNH_2)$]— or —[$CF_2$—$CF(O(CF_2)_3CONHOH)$]—.

The fluorinated polymer (A1) may contain one type of units (U1) alone or two or more types of units (U1) in combination so long as it has at least three groups (F). From the viewpoint of excellent adhesion between the covering layer and the substrate, as the fluorinated polymer (A1), a fluorinated polymer containing units (U1) in which the $Z^1$ is $NR^1NR^2H$ is preferred. The type of $Z^1$ and the solubility in an alcohol are as described above.

Units (U1) in which $Z^1$ is $NR^1NR^2H$ and $NR^3OR^4$ can be formed by the later-described method for producing the fluorinated polymer (A1).

Hereinafter, as shown in the following formulae (U1a) and (U1b), a unit (U1) in which $Z^1$ is $NR^1NR^2H$ will be referred to as a "unit (U1a)", and a unit (U1) in which $Z^1$ is $NR^3OR^4$ will be referred to as a "unit (U1b)".

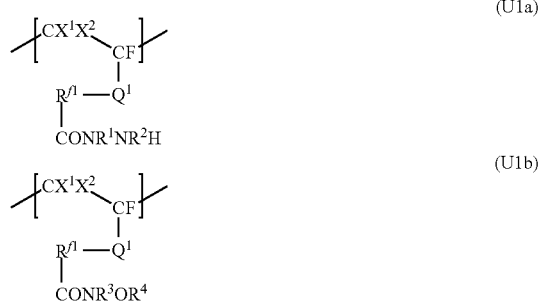

In the formula (U1a) and the formula (U1b), $X^1$, $X^2$, $Q^1$, $R^{f1}$, $R^1$, $R^2$, $R^3$ and $R^4$ are as defined in the formula (U1), and their examples and preferred ranges are also the same.

(Units Other than Unit U1)

The fluorinated polymer (A1) may have, in addition to the unit (U1), a fluoroethylene unit (hereinafter referred to also as a "unit (U2)"), a unit represented by the formula (U3) as described later (hereinafter referred to also as a "unit (U3)") and other unit (hereinafter referred to also as a "unit (U4)").

<Unit (U2)>

Specific examples of the unit (U2) may be units derived from tetrafluoroethylene ($CF_2$=$CF_2$) (TFE), trifluoroethylene ($CF_2$=CHF) (TrFE), chlorotrifluoroethylene (CFCl=$CF_2$), vinylidene fluoride ($CF_2$=$CH_2$), etc. From the viewpoint of excellent light resistance, the TFE unit, the TrFE unit and the chlorotrifluoroethylene unit are preferred. The TFE unit is particularly preferred from the viewpoint of excellent adhesion to the substrate by facilitating the presence of highly polar —$COZ^1$ groups at the interface. The TrFE unit and the chlorotrifluoroethylene unit are particularly preferred from such a viewpoint that the crystallinity of the fluorinated polymer will not be as high as by the TFE unit, light scattering will be less likely to occur and transparency will be high. The TrFE unit is particularly preferred from the viewpoint of excellent solubility in an alcohol.

The fluorinated polymer may contain one type of units (U2) alone, or two or more types of units (U2) in combination.

<Unit (U3)>

The unit (U3) is a unit represented by the following formula (U3) (but excluding a fluoroethylene unit).

—[$CX^3X^4$—$CY^1Y^2$]— (U3)

In the formula (U3), $X^3$ and $X^4$ are each independently a hydrogen atom, a fluorine atom or a chlorine atom, $Y^1$ is a hydrogen atom, a fluorine atom or a chlorine atom, and $Y^2$ is a hydrogen atom, a fluoroalkyl group, a fluoroalkyl group with at least two carbon atoms having an etheric oxygen atom between carbon-carbon atoms, a fluoroalkoxy group, a fluoroalkoxy group with at least two carbon atoms having an etheric oxygen atom between carbon-carbon atoms, a fluoroalkenyl group, or a fluoroalkenyl group with at least two carbon atoms having an etheric oxygen atom between carbon-carbon atoms.

The number of carbon atoms in the fluoroalkyl group in $Y^2$ is preferably from 1 to 15, particularly preferably from 1 to 6. The fluoroalkyl group is preferably a perfluoroalkyl group, more preferably a $C_{1-6}$ perfluoroalkyl group, particularly preferably —$CF_3$, from the viewpoint of excellent thermal stability. The number of carbon atoms in the fluoroalkyl group with at least carbon atoms having an etheric oxygen atom between carbon-carbon atoms as $Y^2$ is preferably from 2 to 15, particularly preferably from 2 to 6. From the viewpoint of excellent thermal stability, a perfluoroalkyl group with at least two carbon atoms having an etheric oxygen atom between carbon-carbon atoms is preferred, and a $C_{2-6}$ perfluoroalkyl group having an etheric oxygen atom between carbon-carbon atoms is particularly preferred.

The number of carbon atoms in the fluoroalkoxy group in $Y^2$ is preferably from 1 to 15, particularly preferably from 1 to 6. From the viewpoint of excellent thermal stability, the fluoroalkoxy group as $Y^2$ is preferably a $C_{1-6}$ perfluoroalkoxy group, particularly preferably —$OCF_3$, —$OCF_2CF_3$, —$O(CF_2)_2CF_3$ or —$O(CF_2)_3CF_3$. The number of carbon atoms in the fluoroalkoxy group with at least two carbon atoms having an etheric oxygen atom between carbon-carbon atoms in $Y^2$ is preferably from 2 to 15, particularly preferably from 2 to 6. From the viewpoint of excellent thermal stability, a perfluoroalkoxy group with at least two carbon atoms having an etheric oxygen atom between carbon-carbon atoms is preferred, and a $C_{2-6}$ perfluoroalkoxy group having an etheric oxygen atom between carbon-carbon atoms is particularly preferred.

The number of carbon atoms in the fluoroalkenyl group in $Y^2$ is preferably from 5 to 15 from such a viewpoint that cyclization will be less likely to proceed in molecules and the fluoroalkenyl group can be easily synthesized. From the viewpoint of excellent thermal stabilities, a perfluoroalkenyl group is preferred, and —$(CF_2)_4CF$=$CF_2$, —$(CF_2)_5CF$=$CF_2$ and —$(CF_2)_6CF$=$CF_2$ are particularly preferred. The number of carbon atoms in the fluoroalkenyl group with at least two carbon atoms having an etheric oxygen atom between carbon-carbon atoms in $Y^2$ is preferably from 2 to 15, particularly preferably from 2 to 6. From the viewpoint of excellent thermal stability, a perfluoroalkenyl group with at least two carbon atoms having an etheric oxygen atom between carbon-carbon atoms is preferred, and a $C_{2-6}$ perfluoroalkenyl group having an etheric oxygen atom between carbon-carbon atoms is particularly preferred.

As specific examples of the unit (U3), the following units may be mentioned.

—[$CH_2$—$CH_2$]—, —[$CF_2$—$CF(CF_3)$]—, —[$CH_2$—$CF(CF_3)$]—, —[$CH_2$—$CH(CF_3)$]—, —[$CH_2$—$CF((CF_2)_3CF_3)$]—, —[$CH_2$—$CF((CF_2)_5CF_3)$]—, —[$CF_2$—$CF(OCF_3)$]—, —[$CF_2$—$CF(OCF_2CF_3)$]—, —[$CF_2$—$CF(O(CF_2)_2CF_3)$]—, —[$CF_2$—$CF(O(CF_2)_3CF_3)$]—, —[$CF_2$—$CF(OCF_2CF(CF_3)O(CF_2)_2CF_3)$]—, —[$CF_2$—$CF((CF_2)_4CF$=$CF_2)$]—, —[$CF_2$—$CF((CF_2)_5CF$=$CF_2)$]—, —[$CF_2$—$CF((CF_2)_6CF$=$CF_2)$]—.

The unit (U3) is preferably —[$CH_2$—$CH_2$], —[$CF_2CF(CF_3)$]—, —[$CF_2$—$CF(OCF_3)$]—, —[$CF_2CF(O(CF_2)_2CF_3)$]— or —[$CF_2$—$CF(OCF_2CF(CF_3)O(CF_2)_2CF_3]$—, from the viewpoint of the low glass transition temperature, excellent fluidity and excellent formability of the fluorinated polymer (A1) and from such a viewpoint that the crosslinking reaction between molecules can easily be proceeded when the fluorinated polymer (A1) is cured by reacting it with the curing agent (B).

The fluorinated polymer may contain one type of units (U3) alone, or may contain two or more types of units (U3) in combination.

The units (U3) can be formed by polymerizing the compound (31) as a monomer.

$$CX^3X^4=CY^1Y^2 \quad (31)$$

(in the formula (31), $X^3$, $X^4$, $Y^1$, and $Y^2$ are as defined in the formula (U3), and their examples and preferred ranges are also the same.)

Units (U4) may, for example, be units derived from monomers such as propylene, isobutene, 2-trifluoromethyl-3,3,3-trifluoro-1-propene, etc.

Preferred Embodiments of Fluorinated Polymer (A1)

It is preferred that the number of groups (F) in the fluorinated polymer (A1) is at least 3 from the viewpoint of excellent crosslinking reactivity between groups (F), and should better be small when the molecular weight of the fluorinated polymer (A1) is large, and should better be large when the molecular weight is small. The number of groups (F) is usually preferably from 3 to 100, more preferably from 3 to 30. The number of groups (F) is an average number per molecule. The number of groups (F) in the fluorinated polymer (A1) corresponds to the number of units (U1) in the fluorinated polymer (A1).

$Z^1$ in at least three groups (F) is preferably either $NR^1NR^2H$ or $NR^3OR^4$, more preferably $NR^1NR^2H$. That is, at least three units (U1) are preferably either units (U1a) or units (U1b), more preferably units (U1b).

When units (U1) consist of two types of units (U1a) and units (U1b), the units (U1a) are preferably from 1 to 90 mol %, more preferably from 5 to 70 mol %, particularly preferably from 10 to 60 mol %, to the total of the units (U1a) and the units (U1b), from the viewpoint of the solubility in an alcohol of the fluorinated polymer (A1), suppression of foaming during the curing, and high crosslinking density of the obtainable cured product.

The mass average molecular weight of the fluorinated polymer (A1) is preferably from 1,000 to 1,000,000. The mass average molecular weight being at least 3,000 is preferred, since the amount of volatile components is small. The mass average molecular weight being at most 100,000 is preferred, since the polymer is excellent in solubility. Further, when the mass average molecular weight of the fluorinated polymer (A1) is from 1,000 to 15,000, the viscosity of the fluorinated polymer (A1) at 25° C. will be from 1 to 1,000 Pa·s, and the viscosity becomes at most 10 Pa·s by heating at from 25 to 100° C., whereby a curing agent composition containing the fluorinated polymer (A1) can be coated on a conductor wire or a resin substrate without using a solvent. The fluorine atom content in the fluorinated polymer (A1) is the same as that described for the fluorinated polymer (A). The viscosity of the fluorinated polymer can be measured by a rotary viscometer.

The mass average molecular weight can be obtained as a molecular weight calculated as PMMA (poly(methyl methacrylate)) by gel permeation chromatography (GPC). In this specification, unless otherwise specified, the mass average molecular weight is one obtained by the above method.

The content of units (U1) in the fluorinated polymer (A1) is preferably from 0.02 to 7.1 mmol/g, more preferably from 0.1 to 4 mmol/g, further preferably from 0.1 to 3 mmol/g, particularly preferably from 0.2 to 1 mmol/g, to the mass of the fluorinated polymer (A1), in consideration of the solubility in an alcohol of the fluorinated polymer (A1), suppression of foaming during the curing, crosslinking density of the obtainable cured product, etc.

When units (U1) consist of only units (U1a) in which $Z^1$ is $NR^1NR^2H$, the content of the units (U1a) to the mass of the fluorinated polymer (A1) is preferably from 0.02 to 4 mmol/g, more preferably from 0.02 to 1 mmol/g, particularly preferably from 0.2 to 0.5 mmol/g, in consideration of the solubility in an alcohol of the fluorinated polymer (A1), suppression of foaming during the curing, crosslinking density of the obtainable cured product, etc.

When units (U1) consist of only units (U1b) in which $Z^1$ is $NR^3OR^4$, the content of the units (U1b) to the mass of the fluorinated polymer (A1) is preferably from 0.1 to 4 mmol/g, more preferably from 0.2 to 3 mmol/g, particularly preferably from 0.3 to 1 mmol/g, in consideration of the solubility in an alcohol of the fluorinated polymer (A1), suppressing foaming during the curing, crosslinking density of the obtainable cured product, etc.

The contents of units (U1a) and units (U1b) in the fluorinated polymer (A1) can be calculated by $^{19}$F-NMR measurements.

The proportion of units (U1) in all units in the fluorinated polymer (A1) is preferably from 1 to 100 mol %, more preferably from 3 to 98 mol %, further preferably from 3 to 50 mol %, particularly preferably from 5 to 15 mol %, in consideration of the solubility in an alcohol of the fluorinated polymer (A1), suppression of foaming during the curing, crosslinking density of the obtainable cured product, etc.

A preferred embodiment of the fluorinated polymer (A1) is a fluorinated polymer comprising units (U1), units (U2) and units (U3), wherein in all units in the fluorinated polymer, the proportion of units (U1) is from 1 to 98 mol %, the proportion of units (U2) is from 1 to 95 mol %, and the proportion of units (U3) is from 1 to 95 mol %.

The contents of units (U1) to units (U4) in the fluorinated polymer (A1) can be calculated by $^{19}$F-NMR and $^1$H-NMR measurements.

[Method for Producing Fluorinated Polymer (A1)]

The fluorinated polymer (A1) in which units (U1) consist of only units (U1a) can be produced by, for example, a method in which a fluorinated polymer containing the following units (U11) and a hydrazine compound represented by the following formula (5) (hereinafter referred to also as a "hydrazine compound") are reacted to modify some or all of the units (U11) to units (U1a).

In the formula (U11), $R^5$ is an alkyl group. $R^5$ is preferably a $C_{1-6}$ alkyl group, more preferably a $C_{1\,or\,2}$ alkyl group, particularly preferably a methyl group. $X^1$, $X^2$, $Q^1$ and $R^{f1}$ are as defined in the formula (U1), and their examples and preferred ranges are also the same.

$$HR^1N-NR^2H \quad (5)$$

In the formula (5), $R^1$ and $R^2$ are as defined in the formula (U1), and their examples and preferred ranges are also the same.

The fluorinated polymer (A1) containing units (U11) is obtainable by polymerizing a monomer represented by the following formula (11) (hereinafter referred to as a "monomer (11)") and an optional monomer such as fluoroethylene, a monomer (31) or the like by a known method (e.g. the method described in WO2015/098773) by using them so that in the obtainable fluorinated polymer (A1), units (U1a), units (U2), units (U3), etc. derived from the respective monomers will be in desired proportions.

$$CX^1X^2=CF-Q^1R^{f1}-COOR^5 \qquad (11)$$

In the formula (11), $X^1$, $X^2$, $Q^1$, $R^{f1}$ and $R^5$ are as defined in the formula (U1), and their examples and preferred ranges are also the same.

The polymerization method may be a known polymerization method such as suspension polymerization, solution polymerization, emulsion polymerization, bulk polymerization or the like. Solution polymerization is preferred in that it is easy to control the molecular weight to a predetermined level. As the solvent for solution polymerization, a fluorinated solvent as described later is preferred.

As the hydrazine compound, hydrazine, hydrazine monohydrate, methylhydrazine, 1,2-dimethylhydrazine, etc. may be mentioned, and hydrazine monohydrate is preferred from the viewpoint of safety and superior solubility in an alcohol of the obtainable fluorinated polymer (A1). The form of the hydrazine compound to be subjected to the reaction may be an aqueous solution or a salt. As the hydrazine compound, a commercial product may be used.

The modification ratio of the units (U11) to units (U1a) may be adjusted by the addition amount of the hydrazine compound to the units (U11) in the fluorinated polymer (A1) containing the units (U11) to be used as raw material. Here, in the obtainable fluorinated polymer (A1), the content of units in which $Z^1$ is $NR^1NR^2H$ can be measured by quantifying the remaining —$COOR^5$ groups by infrared spectroscopy (IR).

The amount of the hydrazine compound to be used is preferably from 0.1 to 20 mol, more preferably from 0.3 to 15 mol, particularly preferably from 0.5 to 10 mol, to 1 mol of groups represented by —$COOR^5$ in the fluorinated polymer (A1) containing units (U11). In a case where all of the units (U11) are to be modified to units (U1a), it is preferred to use from 3 to 20 mol of the hydrazine compound per mol of groups represented by —$COOR^5$.

The reaction may be carried out in the presence of a solvent. As the solvent, preferred is one capable of dissolving the raw material components (the fluorinated polymer (A1) containing units (U11), the hydrazine compound). A solvent capable of dissolving at least the fluorinated polymer (A1) containing units (U11) is preferred. As the solvent, a fluorinated solvent, an ether-type solvent, and an ester-type solvent may be mentioned, and the solvent may be appropriately selected according to the polarity of the raw material components, etc. As the solvent, one type may be used alone, or two or more types may be used as mixed. Further, it is also preferred to use such a solvent and an alcohol as mixed. It is also possible to add an alcohol as the reaction proceeds. Here, as the alcohol, one described in the section for (Fluorinated polymer (A)) may be used.

The fluorinated solvent contains fluorine and carbon, and may further contain chlorine, oxygen and hydrogen. For example, a fluorinated alkane, a fluorinated aromatic compound, a fluoroalkyl ether, a fluorinated alkylamine, a fluoroalcohol, etc. may be mentioned.

As the fluorinated alkane, a $C_{4-8}$ compound is preferred. Commercial products may, for example, be $CF_3CH_2CF_2H$ (HFC-245fa), $CF_3CH_2CF_2CH_3$ (HFC-365mfc), perfluorohexane, 1H-perfluorohexane, perfluorooctane, $C_6F_{13}H$ (manufactured by Asahi Glass Co., Ltd., Asahiklin (registered trademark) AC-2000), $C_6F_{13}C_2H_5$ (manufactured by Asahi Glass Co., Ltd., Asahiklin (registered trademark) AC-6000), $C_2F_5CHFCHFCF_3$ (manufactured by Chemers, Bartrel (registered trademark) XF), etc.

The fluorinated aromatic compound may, for example, be hexafluorobenzene, trifluoromethylbenzene, perfluorotoluene, bis(trifluoromethyl)benzene, etc. As the fluoroalkyl ether, a $C_{4-12}$ compound is preferred. Commercial products may, for example, be $CF_3CH_2OCF_2CF_2H$ (manufactured by Asahi Glass Co., Ltd., Asahiklin (registered trademark) AE-3000,), $C_4F_9OCH_3$ (manufactured by 3M, Novec (registered trademark) 7100), $C_4F_9OC_2H_5$ (manufactured by 3M, Novec (registered trademark) 7200), $C_2F_5CF(OCH_3)C_3F_7$ (manufactured by 3M, Novec (registered trademark) 7300), etc.

The fluorinated alkylamine may, for example, be perfluorotripropylamine, perfluorotributylamine, etc. The fluoroalcohol may, for example, be 2,2,3,3-tetrafluoropropanol, 2,2,2-trifluoroethanol, hexafluoroisopropanol, etc. Other solvents may, for example, be dichloropentafluoropropane (HCFC-225), perfluoro(2-butyltetrahydrofuran), etc. The dichloropentafluoropropane is commercially available as Asahiklin (registered trademark) AK-225 series (manufactured by Asahi Glass Co., Ltd.) such as AK-225G.

The ether-type solvent may, for example, be ethylene glycol dimethyl ether, ethylene glycol diethyl ether, diethylene glycol dimethyl ether, diisopropyl ether, ethylene glycol monomethyl ether, ethylene glycol monoethyl ether, ethylene glycol monobutyl ether, propylene glycol monomethyl ether, propylene glycol dimethyl ether, etc.

The ester-type solvent may, for example, be methyl acetate, ethyl acetate, n-propyl acetate, isopropyl acetate, n-butyl acetate, isobutyl acetate, etc.

The reaction is carried out, for example, by dissolving a fluorinated polymer containing units (U11) in the above-mentioned solvent and adding a hydrazine compound at from 0 to 30° C. After the addition, the mixture is heated to from 30 to 100° C. and reacted for from 1 minute to 10 hours, whereby it is possible to obtain the desired fluorinated polymer (A1) containing units (U1a).

The fluorinated polymer (A1) in which units (U1) consist of only units (U1b) can be produced by, for example, a method in which a fluorinated polymer containing units (U11) obtained as described above is reacted with a hydroxylamine compound represented by the following formula (6) (hereinafter referred to also as a "hydroxylamine compound") to modify units (U11) to units (U1b).

$$NHR^3OR^4 \qquad (6)$$

In the formula (6), $R^3$ and $R^4$ are as defined in the formula (U1), and their examples and preferred ranges are also the same.

The hydroxylamine compound may, for example, be hydroxylamine, N-methylhydroxylamine, N,O-dimethylhydroxylamine, or isopropylhydroxylamine. Hydroxylamine is preferred from the viewpoint of better solubility in an alcohol of the obtainable fluorinated polymer (A1). The form of the hydroxylamine compound to be subjected to the reaction may be an aqueous solution or a salt. An aqueous solution is preferred from the viewpoint of safety. As the hydroxylamine compound, a commercial product may be used.

As the method for producing the fluorinated polymer (A1) containing units (U1b) by reacting the fluorinated polymer (A1) containing units (U11) and the hydroxylamine compound to modify the units (U11) to units (U1b), for example, the same method as the above method for producing the fluorinated polymer (A1) containing unit (U1a), may be mentioned except that in the above method, the hydrazine compound is changed to a hydroxylamine compound. Also in such a case, it is possible to measure the content of units in which is $NR^3OR^4$ by quantifying the remaining $—COOR^5$ groups by infrared spectroscopy (IR).

In a case where the fluorinated polymer (A1) contains both units (U1a) and units (U1b), as the method for producing the fluorinated polymer (A1), the following may specifically be mentioned.

(a) The fluorinated polymer containing units (U11) and the hydrazine compound are reacted, and then the hydroxylamine compound is reacted.

(b) The fluorinated polymer containing units (U11) and the hydroxylamine compound are reacted, and then the hydrazine compound is reacted.

(c) The fluorinated polymer containing units (U11) is reacted with the hydroxylamine compound and the hydrazine compound.

However, in the above (a) to (c), the amounts of the hydrazine compound and the hydroxylamine compound to be used, are adjusted to meet with the proportions of units (U1a) and units (U1b) in the desired fluorinated polymer (A1).

<Fluorinated Polymer (A2)>

The fluorinated polymer (A2) is a fluorinated polymer having at least three groups (F1) as groups (F).

$$—(R^{f2}O)_k—R^{f1}COZ^1 \tag{F1}$$

In the formula (F1), $R^{f2}$ is a $C_{1-4}$ perfluoroalkylene group. k is an integer of from 1 to 200. $—R^{f1}COZ^1$ corresponds to a group (F).

In a group (F1), $R^{f2}$ being a $C_{1-4}$ perfluoroalkylene group specifically means that $—(R^{f2}O)_k—$ is $—(C_aF_{2a}O)_k—$ (a is an integer of from 1 to 4, k is an integer of from 1 to 200, and the respective $—C_aF_{2a}O—$ units may be the same or different).

The $—C_aF_{2a}O—$ unit may be linear or branched and may, for example, be $—CF_2CF_2CF_2CF_2O—$, $—CF_2CF_2CF_2O—$, $—CF(CF_3)CF_2O—$, $—CF_2CF_2O—$ or $—CF_2O—$. k may suitably be adjusted depending on the desired molecular weight. A preferred range of k is from 2 to 100.

$R^{f2}$ may be a combination of a plurality of units, and in such a case, the respective units may be present in block, alternating or randomly.

$—(R^{f2}O)_k—$ may specifically be $—(CF_2CF_2CF_2CF_2O)_{k1}—(CF_2CF_2CF_2O)_2—(CF(CF_3)CF_2O)_{k3}—(CF_2CF_2O)_{k4}—(CF_2O)_{k5}—$ (where k1, k2, k3, k4 and k5 are each independently an integer of 0 or more, provided the sum of k1, k2, k3, k4 and k5 is from 1 to 200, and the respective repeating units may be present either in blocks, alternating or randomly.

$R^{f2}$ is preferably $\{(CF_2O)_{k11}(CF_2CF_2O)_{k12}\}$, $(CF_2CF_2O)_{k13}$ or $(CF_2CF_2CF_2O)_{k14}$, more preferably $\{(CF_2O)_{k11}(CF_2CF_2O)_{k12}\}$ or $(CF_2CF_2O)_{k13}$. Here, k11 is an integer of at least 1, k12 is an integer of at least 1, k11+k12 is an integer of from 2 to 200, and the bonding order of k11 $CF_2O$ and k12 $CF_2CF_2O$ is not limited. Each of k13 and k14 is an integer of from 1 to 200.

Specific examples of the group (F1) include the following groups.

$—(CF_2O)_{k11}(CF_2CF_2O)_{k12}—CF_2—COZ^1$,
$—(CF_2O)_{k11}(CF_2CF_2O)_{k12}—(CF_2)_2—COZ^1$,
$—(CF_2O)_{k11}(CF_2CF_2O)_{k12}—(CF_2)_3—COZ^1$,
$—(CF_2CF_2O)_{k13}—CF_2—COZ^1$,
$—(CF_2CF_2O)_{k13}—(CF_2)_2—COZ^1$,
$—(CF_2CF_2CF_2O)_{k14}—(CF_2)_2—COZ^1$,
$—(CF_2CF_2CF_2O)_{k14}—(CF_2)_3—COZ^1$,

In the above formulae, $Z^1$ is $—NHNH_2$, $—N(CH_3)NHCH_3$, $—NHOH$ or $—NHOCH_3$. k11, k12 and k14 are the same as described above.

In $—(CF_2O)_{k11}(CF_2CF_2O)_{k12}$, it is preferred that k11 is from 1 to 50, k12 is from 3 to 149, and k11+k12 is from 5 to 150, and it is more preferred that k11 is from 1 to 10, k12 is from 10 to 99, and k11+k12 is from 15 to 100. In $—(CF_2CF_2O)_{k13}$, k13 is preferably from 5 to 150, more preferably from 15 to 100. In $—(CF_2CF_2CF_2O)_{k14}$, k14 is preferably from 5 to 150, more preferably from 15 to 100.

The fluorinated polymer (A2) may contain one type of groups (F1) alone, or two or more types of groups (F1) in combination, so long as it has at least three groups (F1). From the viewpoint of better adhesiveness between the covering layer and the substrate, as the fluorinated polymer (A2), a fluorinated polymer containing groups (F1) in which $Z^1$ is $NR^1NR^2H$ is preferred. The curing conditions, the type of $Z^1$ and the solubility in an alcohol, are as described above.

Hereinafter, as shown in the following formulae (F1a) and (F1b), a group (F1) in which $Z^1$ is $NR^1NR^2H$ will be referred to as a group (F1a), and a group (F1) in which $Z^1$ is $NR^3OR^4$ will be referred to as a group (F1b).

$$—(R^{f2}O)_k—R^{f1}CONR^1NR^2H \tag{F1a}$$

$$—(R^{f2}O)_k—R^{f1}CONR^3OR^4 \tag{F1b}$$

At least three groups (F1) in the fluorinated polymer (A2) are preferably one type of the groups from such a viewpoint that the production of the fluorinated polymer (A2) will be simple, the curing reaction in the curable composition will be excellent in uniformity, etc. A combination of two types of the groups which react with each other is also preferred. Specifically, it is preferred that groups (F1) in the fluorinated polymer (A2) consist of either one type of groups (F1a) or groups (F1b), or a combination of groups (F1a) and groups (F1b).

The fluorinated polymer (A2) may, for example, be a compound represented by the following formula (A2a):

$$(F1-)_nY^3(—F2)_m \tag{A2a}$$

F1: a group represented by the formula (F1). n is an integer of at least 3.

$Y^3$: a (n+m) valent perfluorinated saturated hydrocarbon group, a (n+m) valent perfluorinated saturated hydrocarbon group having an etheric oxygen atom between carbon-carbon atom, a (n+m) valent carbon skeleton, or a (n+m) valent carbon skeleton having an etheric oxygen atom between carbon-carbon atom, in which no $—OCF_2O—$ structure is present. n+m is an integer from 3 to 20.

F2: a group represented by the following formula (F2). m is an integer of 0 or more.

$$R^{f3}—(CF_2CF_2CF_2CF_2O)_{k1}—(CF_2CF_2CF_2O)_{k2}—(CF(CF_3)CF_2O)_{k3}— \tag{F2}$$

In the formula (F2), k1, k2 and k3 are the same as described above. $R^{f3}$ is a $C_{1-20}$ perfluoroalkyl group, a $C_{1-20}$ perfluoroalkoxy group, a $C_{2-20}$ perfluoroalkyl group having an etheric oxygen atom between carbon-carbon atoms (in which a $—OCF_2O—$ structure is not present), or a $C_{2-20}$ perfluoroalkoxy group having an etheric oxygen atom between carbon-carbon atoms (in which a —OCF$_2$O-structure is not present).

The number of carbon atoms in $Y^3$ is preferably from 1 to 50, more preferably from 1 to 20, further preferably from 1 to 5. $Y^3$ may, for example, be groups represented by the following (a) to (g). The valence of $Y^3$ is represented by a (n+m) valence and is an integer of from 3 to 20. The value of (n+m) is preferably from 3 to 6.

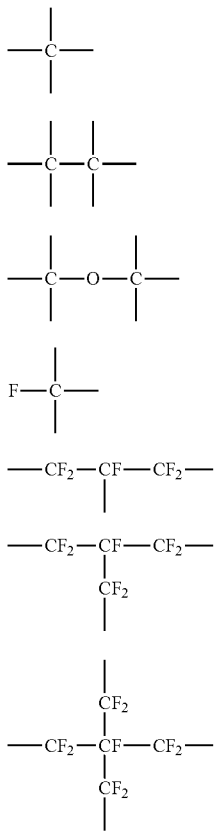

$R^{f3}$ may be a structure having a straight chain structure, a branched structure, a ring structure, or a partial ring structure, and a straight chain structure or a branched structure is preferred, and a straight chain structure is particularly preferred. As $R^{f3}$, a perfluoroalkyl group or a perfluoroalkoxy group is preferred, and a perfluoroalkoxy group is more preferred. The number of carbon atoms in $R^{f3}$ is more preferably from 1 to 10, particularly preferably from 1 to 6. Specifically a trifluoromethoxy group, a heptafluoropropyloxy group, a tridecafluorohexyloxy group, etc. may be mentioned. When the fluorinated polymer (A2a) has groups (F2), it is possible to suppress foaming at the time of the curing, to adjust the crosslinking density of the obtainable cured product, etc. The proportion of m to n+m in the fluorinated polymer (A2a) is preferably from 0 to 0.5.

In the fluorinated polymer (A2a), n indicating the number of groups (F1) is not particularly limited as long as it is at least 3. Groups (F1) may be attached to all of the bonds of $Y^3$. For example, when $Y^3$ is a group (a), the number of groups (F1) may be 3 or 4. The fluorinated polymer (A2a) is preferably a compound in which $Y^3$ is a group (a) and the number n of groups (F1) is 4, from the viewpoint of excellent crosslinking efficiency.

The mass average molecular weight of the fluorinated polymer (A2) is preferably from 1,000 to 20,000. The mass average molecular weight is more preferably at least 3,000, since the evaporation components are less. The mass average molecular weight is more preferably at most 10,000, since the polymer is excellent in solubility. Further, when the mass average molecular weight of the fluorinated polymer (A2) is from 1,000 to 5,000, the viscosity at 25° C. is from 1 to 100 Pa·s, and becomes at most 10 Pa·s by heating at from 25 to 100° C., whereby a curable composition containing the fluorinated polymer (A1) can be coated on a conductor wire or resin equipment without using a solvent. The fluorine atom content of the fluorinated polymer (A2) is the same as described for the fluorinated polymer (A).

[Method for Producing Fluorinated Polymer (A2)]

The fluorinated polymer (A2) can be produced by, for example, a method for synthesizing $Y^3[(R^{f2}O)_k$—$R^{f1}COF]_n$ as a fluorinated polymer (A2a) in which groups (F1) consist of groups (F1b) by a known method (e.g. the method described in Japanese Patent No. 5,028,801), esterifying the —COF groups to obtain a compound having groups represented by the following formula (F11), and then reacting the above-mentioned hydrazine compound to modify some or all of —COOR$^5$ groups to groups (F1a).

—(R$^{f2}$O)$_k$—R$^{f1}$COOR$^5$ (F11)

In the above formula (F11), $R^{f1}$, $R^{f2}$ and k are as defined in the formula (F1), and their examples and preferable ranges are also the same. $R^5$ is defined in the formula (U11), and its examples and preferred range are also the same.

Specifically, a fluorinated polymer (A2a) in which some or all of groups (F1) consist of groups (F1a) can be produced by a method similar to the above method in which some or all of units (U11) in the fluorinated polymer (U11) containing the units (U11) are modified by a hydrazine compound to form units (U1a). However, in the fluorinated polymer (A2a), the reaction temperature is preferably in a range of from 10 to 100° C.

The fluorinated polymer (A2a) in which groups (F1) consist of groups (F1b) can be produced by, for example, a method in which the compound containing group (F11) obtained as described above is reacted with the above hydroxylamine compound to modify some or all of the groups (F11) to groups (F1b).

Specifically, the fluorinated polymer (A2a) in which groups (F1) consist of groups (F1b) can be produced by a method similar to the above method in which some or all of units (U11) in the fluorinated polymer (A1) containing the units (U11) are modified by a hydroxylamine compound to form units (U1b). However, in the fluorinated polymer (A2a), the reaction temperature is preferably in a range of from 10 to 100° C.

[Curing Agent (B)]

The curing agent (B) in the present invention is at least one curing agent selected from the group consisting of an isocyanate-type curing agent, a blocked isocyanate-type curing agent and an amino resin-type curing agent. In the case of a polyisocyanate, the curing agent (B) reacts with —COZ$^1$ groups in the fluorinated polymer (A) to form cross-linked structures and thus contributes to curing of the curable composition. In the case of a monoisocyanate, a cross-linked structure is not formed immediately after the reaction, but a cross-linked structure will be formed by a subsequent elimination reaction and thus contributes to curing of the curable composition. As the curing agent (B), one type may be used alone, or two or more types may be used in combination.

(B1) Isocyanate-Type Curing Agent

The isocyanate-type curing agent may, for example, be a non-yellowing isocyanate, a non-yellowing isocyanate modified form, an aromatic isocyanate, or an aromatic isocyanate modified form. The isocyanate groups of the isocyanate-type curing agent are not blocked. The non-yellowing isocyanate may, for example, be an alicyclic polyisocyanate such as isophorone diisocyanate (IPDI) or dicyclohexylmethane diisocyanate (HMDI); an aliphatic polyisocyanate such as hexamethylene diisocyanate (HDI); or a monoisocyanate such as cyclohexyl isocyanate or n-hexyl isocyanate.

As the non-yellowing isocyanate modified form, for example, the following modified forms (I1) to (I4) may be mentioned.

(I1) An isocyanurate form of an aliphatic diisocyanate or an alicyclic diisocyanate.

(I2) A modified form having a structure represented by —C(=O)—NH—, obtained by modifying an aliphatic diisocyanate or alicyclic diisocyanate with a polyol or polyamine.

(I3) A modified form having a structure represented by —C(=O)—NH—, obtained by modifying some of isocyanate groups of an isocyanurate form of an aliphatic diisocyanate or alicyclic diisocyanate with a polyol.

(I4) A modified form consisting of a mixture of the modified form (I1) and the modified form (I2).

When yellowing is not problematic, an aromatic isocyanate or an aromatic isocyanate modified form may be used as the isocyanate-type curing agent. As the aromatic isocyanate, methylenediphenyl 4,4'-diisocyanate, 1,4-phenylenediisocyanate, 4,4'-diisocyanate-3,3'-dimethylbiphenyl, phenylisocyanate, etc. may be mentioned.

As the aromatic isocyanate modified form, for example, the following modified forms (I5) to (I8) may be mentioned.

(I5) An isocyanurate form of an aromatic diisocyanate.

(I6) A modified form having a structure represented by —C(=O)—NH— obtained by modifying an aromatic diisocyanate with a polyol or polyamine.

(I7) A modified form having a structure represented by —C(=O)—NH—, obtained by modifying some of isocyanate groups of an isocyanurate form of an aromatic diisocyanate with a polyol.

(I8) A modified form consisting of a mixture of the modified form (I5) and the modified form (I6).

When an isocyanate-type curing agent in which isocyanate groups are not blocked is used as the curing agent, blending of the curing agent into the curable composition may be performed immediately before the curable composition is applied to the substrate, or blending of the curing agent into the curable composition may be performed on the substrate. When the blending is performed on the substrate, the order of blending the components to be contained in the curable composition is not particularly limited.

(B2) Blocked Isocyanate-Type Curing Agent

The blocked isocyanate-type curing agent is one having isocyanate groups in an isocyanate-type curing agent blocked.

Blocking of isocyanate groups can be accomplished by epsilon caprolactam (E-CAP), methyl ethyl ketone oxime (MEK-OX), methyl isobutyl ketone oxime (MIBK-OX), pyrazine, triazine (TA), ammonia, methanol, a bicarbonate, etc.

(B3) Amino Resin-Type Curing Agent

The amino resin-type curing agent may, for example, be a melamine resin, a guanamine resin, a sulfoamide resin, a urea resin, an aniline resin, etc. Among them, a melamine resin is preferred from the viewpoint of a high curing speed.

As the melamine resin, specifically, alkyl etherified melamine resins which are alkyl-etherified, may be mentioned. Among them, melamine resins substituted by methoxy groups and/or butoxy groups may be more preferably used.

The content of the curing agent (B) in the curable composition of the present invention is preferably from 0.1 to 100 parts by mass, more preferably from 0.5 to 60 parts by mass, further preferably from 1 to 10 parts by mass, to 100 parts by mass of the fluorinated polymer (A). When the content of the curing agent (B) is at least the lower limit value in the above range, a tough cured product is easily obtainable by sufficient crosslinking, and when it is at most the upper limit value, foaming of the cured product due to the reaction between the isocyanate groups and moisture tends to be easily suppressed well.

A cured product to be formed from the curable composition of the present invention can be produced by using only the above-described curable composition. The curable composition may consist solely of the fluorinated polymer (A). As the fluorinated polymer (A), one type may be used alone, or two or more types may be used in combination. When two or more types are used in combination, a combination of two or more types of the fluorinated polymer (A1), a combination of two or more types of the fluorinated polymer (A2), a combination of the fluorinated polymer (A1) and the fluorinated polymer (A2), etc. may be mentioned. The content proportion of the fluorinated polymer (A) in the curable composition is preferably from 10 to 100 mass %, more preferably from 50 to 100 mass %, to the total amount of the curable composition.

(Other Components)

The curable composition may contain, in addition to the fluorinated polymer (A) and the curing agent (B), other reactive components within a range not to impair the above-described crosslinking reaction between the fluorinated polymer (A) and the curing agent (B). Other reactive components may, for example, be a fluorinated polymer having one or two groups (F), a silane coupling agent for improving adhesion to a conductive wire, etc. As the silane coupling agent, for example, one described in WO2015/098773 may be mentioned.

The content of other reactive components in the curable composition is preferably from 0.01 to 50 mass %, more preferably from 0.1 to 10 mass %, as the total content of the respective components, to the total amount of the curable composition.

The curable composition may further contain non-reactive components. The non-reactive components may be an inorganic filler, a fluoropolyether compound, a perfluoro resin such as polytetrafluoroethylene (manufactured by Asahi Glass Co. Ltd., Fluon (registered trademark) PTFE fine powder), a partially fluorinated resin such as an ethylene-tetrafluoroethylene copolymer (Asahi Glass Co. Ltd., Fluon (registered trademark) ETFE powder), an organic pigment, etc.

As the inorganic filler, metal oxide particles such as silica, titania, zirconia, alumina, etc., glass fibers, carbon fibers, or various inorganic pigments are preferred. The longest diameter of the inorganic filler is not particularly limited, but is preferably from 0.1 to 1,000 μm, since it will be easily dispersed in the curable composition. The content of the inorganic filler is preferably from 20 to 200 parts by mass, particularly preferably from 50 to 100 parts by mass, to 100 parts by mass of the curable composition. When the content of the inorganic particles is at least the lower limit value in the above range, the hardness of the cured product of the curable composition will be further increased. When it is at most the upper limit value in the above range, the moldability will be excellent.

The content of the non-reactive components other than the inorganic filler in the curable composition is preferably from 10 to 90 mass %, more preferably from 30 to 70 mass %, to the total amount of the curable composition.

[Coating Material]

The coating material is a liquid composition comprising a curable composition and a liquid (hereinafter referred to also as "liquid (L)") having a boiling point of at most 250° C. in which the curable composition is dissolved or dispersed. The use of the coating material facilitates formation of a precursor layer on a substrate and improves the productivity. Further, when the coating material is used, a precursor layer made of a curable composition is obtainable by removing the solvent from the coating material formed as a coating film on a substrate. Here, the precursor layer refers to a layer or a coating film of the curable composition formed on the substrate. By curing the precursor layer, it is possible to obtain a covering layer or cured layer.

The liquid (L) in the coating material is a liquid having a boiling point of at most 250° C., and, for example, an alcohol may be mentioned. The liquid (L) may further contain a liquid other than an alcohol. As the liquid other than an alcohol, one exemplified as the solvent for producing a fluorinated polymer (but excluding an alcohol) is preferred. The coating material may contain a solvent having a function of sufficiently dissolving or dispersing the curable composition other than the liquid (L). When two or more types of liquids having different boiling points are used, it will be easy to suppress foaming of the cured product.

The content of the curable composition in the coating material is preferably from 0.1 to 99 mass %, more preferably from 1 to 70 mass %, particularly preferably from 5 to 60 mass %, to the total amount of the coating material. The content of the fluorinated polymer (A) in the coating material is preferably from 1 to 70 mass %, more preferably from 5 to 60 mass %, particularly preferably from 10 to 50 mass %, to the total amount of the coating material. The content of the liquid (L) in the coating material is preferably from 1 to 99.9 mass %, more preferably from 30 to 99 mass %, to the total amount of the coating material. The total amount of the solvent and the liquid (L) in the coating material is preferably from 1 to 99.9 mass % to the total amount of the coating material.

[Method for Producing Cured Product]

The cured product of the present invention is formed from the curable composition. The cured product is produced by heating the curable composition to a temperature of at least room temperature and at most 150° C. In a case where the curable composition is cured in the vicinity of room temperature to obtain a cured product, the temperature may or may not be adjusted. In a case where the curable composition is cured at a temperature above room temperature to obtain a cured product, the curable composition may be heated to a temperature in the above range.

The cured product is preferably produced by producing a precursor layer consisting of the curable composition or a precursor layer consisting of a coating material containing the curable composition, and then heating the precursor layer to a temperature of at least room temperature and at most 150° C. in the same manner as described above. Here, when the curing reaction is conducted on the substrate, the type of the substrate, in particular, the heat resistance of the substrate, is not limited.

(Method for Producing Precursor Layer)

The precursor layer can be produced by using the curable composition or the coating material.

As a method of using the curable composition, a method of heating the curable composition to let it flow and cast into a mold to obtain a predetermined shape, a method of casting the curable composition onto a surface of the mold to form a sheet shape or a film shape, a method of forming the curable composition into a predetermined shape by extrusion molding, transfer molding, or the like, or a secondary processing method of e.g. cutting or folding a molded sheet or film into a predetermined shape, may be mentioned.

In the case of producing a cured product formed from the curable composition integrated with the substrate, the cured product of the curable composition integrated with the substrate can be produced by forming a precursor layer by using the substrate as a mold and crosslinking the precursor layer without separating the precursor layer from the substrate. Otherwise, a cured product of the curable composition integrated with the substrate can be produced by a secondary processing such as a method of forming a laminate by superimposing and pressing a molded sheet or film on the substrate.

It is preferred to use a coating material at the time of producing a thin-film precursor layer or a thin-film precursor layer integrated with a substrate. The method of using a coating material is a method suitable for producing a transparent member composed of a thin-film precursor layer or a thin-film precursor layer integrated with a substrate, for example, composed of an antireflection layer and a transparent resin substrate.

The method for applying a coating material may, for example, be a spin coating method, a wipe coating method, a spray coating method, a squeegee coating method, a dip coating method, a die coating method, an inkjet method, a flow coating method, a roll coating method, a casting method, a Langmuir-Blodgett method, a gravure coating method, etc.

(Heat Curing Conditions)

In the case of obtaining a cured product by heating the curable composition, the heating temperature is not particularly limited, but is preferably from 0 to 150° C., particularly preferably from 15 to 60° C. The heating time is not particularly limited, but is preferably from 10 minutes to 10 hours, particularly preferably from 30 minutes to 4 hours. A method of increasing the temperature in a stepwise manner is also effective.

[Cured Product]

The cured product of the present invention is formed from the curable composition. It has high insulating properties and a cross-linked structure, whereby it is excellent in strength. Therefore, it is useful as an insulating tube or insulating paper for protective focusing. The cured product of the curable composition has high transparency and is colorless.

[Electric Wire]

The electric wire of the present invention comprises a conductor wire and a covering layer covering the outer periphery of the conductor wire, and the covering layer is made of a cured product of the curable composition. The curable composition for covering an electric wire to be used for forming the covering layer of the electric wire may contain a reactive component or a non-reactive component in addition to the fluorinated polymer (A) and the curing agent (B).

As the reactive component and non-reactive component, those described above in the section for other components that the curable composition may contain, may be mentioned.

(Method for Producing Electric Wire)

In the production of the electric wire, the curable composition for covering an electric wire may be used as it is, to cover the outer periphery of the conductor wire to form a precursor layer of the curable composition for covering an electric wire. From the viewpoint of excellent workability, it is preferred to produce a covering layer of an electric wire by preparing a coating material for covering an electric wire, comprising a curable composition for covering an electric wire and a liquid (L).

The electric wire in the present invention can be produced by the following method. First, the outer periphery of the conductor wire is coated with a curable composition for covering an electric wire containing a fluorinated polymer (A) to form a precursor layer. Thereafter, the precursor layer obtained as described above is heated to a temperature of at least room temperature and at most 150° C. to obtain a covering layer.

The above method of forming the precursor layer is not particularly limited so long as it is a method of forming a uniform precursor layer over the entire outer periphery of the conductor wire. For example, a method of applying the curable composition to the outer periphery of a conductor wire by heating the curable composition for covering an electric wire to let it flow, a molding method (electric wire extrusion molding) of extruding the curable composition so as to cover the outer periphery of the conductor wire, etc. may be mentioned.

The application of the curable composition for covering an electric wire is preferably conducted by application of a curable composition for covering an electric wire containing a liquid (L) having a boiling point of at most 250° C. and a solvent other than the liquid (L) as the case requires. As the method of applying the coating material for covering an electric wire to the outer periphery of the conductor wire, the same method as the above-described method of applying the coating material can be applied, and in particular, the dip coating method is preferred. Further, when a coating film is formed by using a coating material for covering an electric wire, by volatilizing the above-mentioned liquid (L) and a solvent other than the liquid (L) from the coating film made of the coating material for covering an electric wire, a precursor layer made of the curable composition for covering an electric wire is obtainable.

Next, the precursor layer obtained as described above is heated to a temperature of at least room temperature and at most 150° C. to let it be cured to form a covering layer. The curing method is the same as the curing method of the above-mentioned curable composition, and the heating temperature is appropriately set within the above-mentioned temperature range depending on the type of the curable composition to be used for covering an electric wire, specifically depending on the structure of groups (F) of the fluorinated polymer (A).

In the electric wire of the present invention, for example, the dielectric breakdown strength of the cured product of the curable composition for covering an electric wire is at least 20 kV/mm, and the covering layer has high insulating properties. Further, since the cured product of the curable composition for covering an electric wire has a cross-linked structure, the covering layer is excellent in strength and also in heat resistance. Since the covering layer has the above characteristics, the electric wire of the present invention is excellent in reliability.

The use of the electric wire of the present invention is not particularly limited. Since the electric wire of the present invention is excellent in insulating properties and heat resistance, it is suitable for high-voltage electric wires, communication electric wires, electric wires to be used in motors, generators, blast furnaces, electric furnaces, electric heating devices, medical devices, automobiles, railway vehicles, aircraft, steel mills, power plants, etc., electric wires for power transmission to be used for wireless power supply, reception devices substrates for wireless communication using high-frequency waves, millimeter waves, etc., particularly, for electric wires to be used under high temperatures.

[Resin Article]

The resin article of the present invention comprises a resin substrate and a covering layer covering the surface of the resin substrate, and the covering layer is made of a cured product of the curable composition. The curable composition used for forming the covering layer of the resin article may contain a reactive component in addition to the curable composition. The reactive component may be a fluorinated polymer having one or two groups (F), a silane coupling agent for improving adhesiveness with the resin substrate, etc. The silane coupling agent may be one as described above in the section for other components that the curable composition may contain.

The curable composition may further contain a non-reactive component. The non-reactive component may be metal oxide particles such as silica, titania, zirconia or alumina.

The resin to be used in the resin article of the present invention may be a transparent resin or the like. The transparent resin may be a transparent polyester such as polyethylene terephthalate, a transparent acrylic resin such as polycarbonate or polymethyl methacrylate, a transparent silicone resin such as polydimethylsiloxane, a transparent polyolefin such as a norbornene polymer, polystyrene, a polyurethane resin, an epoxy resin, etc. The resin to be used in the resin article of the present invention may be rubber-like. The rubbery resin may be fluororubber, silicone rubber, urethane rubber, natural rubber, styrene-butadiene rubber (SBR), isoprene rubber, butadiene rubber, chloroprene rubber, acrylonitrile-butadiene rubber (NBR), butyl rubber (isobutene-isoprene rubber, IIR), ethylene-propylene rubber (EPM), ethylene-propylene-diene rubber (EPDM), chlorosulfonated polyethylene, chlorinated polyethylene, acrylic rubber, epichlorohydrin rubber, etc. Here, being "transparent" means that visible light is transmitted at a level of a transmittance of at least about 80%.

(Method for Producing Resin Article)

In the production of the resin article, the curable composition may be used as it is to coat the surface of the resin substrate to form a precursor layer. From the viewpoint of excellent workability, it is preferred to prepare a coating material for coating a resin substrate, which comprises a curable composition for covering a resin substrate and a liquid (L), and to form a coating layer on the resin substrate.

The resin article of the present invention can be produced by the following method. First, the surface of the resin substrate is coated with a curable composition containing a fluorinated polymer (A) to form a precursor layer. Next, the obtained precursor layer is heated to a temperature of at least room temperature and at most 150° C. to obtain a covering layer made of a cured product of the above-mentioned curable composition.

Preferable embodiments of the precursor layer forming method and the curing method in the method for production of the resin article are the same as those in the above-described method for producing the electric wire. The heating temperature and the time in the precursor layer forming method and the curing method in the method for producing the resin article are appropriately set depending on the type of the curable composition for covering the resin substrate, specifically, depending on the structure of groups (F) of the fluorinated polymer (A), etc.

In the resin article of the present invention, the cured product formed from the above-mentioned curable composition has a cross-linked structure, and therefore is excellent in strength and chemical resistance, and the higher the fluorine atom content, the lower the refractive index. Further, by adjusting the components of the curable composition, the crosslinking density, etc., the surface of the covering layer having excellent non-adhesiveness is obtainable.

The use of the resin article of the present invention is not particularly limited. The resin article of the present invention can be obtained by curing the curable composition at a relatively low temperature. Further, since the refractive index of the cured product is low, it is suitable for a resin article having an anti-reflection function. Further, since it has a surface excellent in chemical resistance and non-adhesiveness, it is also suitable for a petri dish or a biochip for cell culture.

EXAMPLES

The invention will be specifically described with reference to the following Examples, but the present invention is by no means limited by the following Examples. Evaluation of each Example was made in accordance with the methods as described below.

[Evaluation Methods]

(Mass Average Molecular Weight)

The mass average molecular weight of a fluorinated polymer was calculated as the molecular weight in terms of PMMA (poly(methyl methacrylate)) by gel permeation chromatography (GPC) by using $CF_2ClCF_2CHClF$ (trade name: Asahiklin AK-225G, manufactured by Asahi Glass Co., Ltd.) as a solvent for the fluorinated polymer precursors P1 and P2 and the fluorinated polymer P3.

(Content of Fluorine Atoms in Fluorinated Polymer)

The contents of fluorine atoms in a fluorinated polymer precursor and a fluorinated polymer were obtained from $^{19}F$-NMR.

(Judgment of Solubility)

To 1 mL of a predetermined liquid, a fluorinated polymer was added in such an amount that the content of the fluorinated polymer would be 5 mass %, followed by stirring and mixing at a temperature of 40° C. for 1 hour, and then cooled to room temperature (25° C.). The obtained mixture was judged depending on whether or not 1 ml of the mixture was filterable without clogging by a PTFE (polytetrafluoroethylene) filter having a pore diameter of 0.5 μm and a diameter of 25 mm. The filtration being possible was judged to be "dissolved", and the filtration being impossible was judged to be "not dissolved".

[Units]

The units referred to in the following Production Examples are as follows:

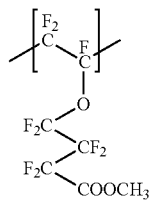

(U11)

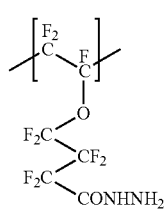

(U1a)

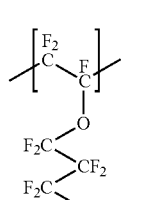

(U1b)

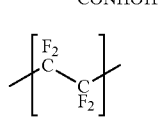

(U2-1)

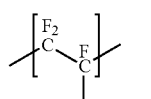

(U3-1)

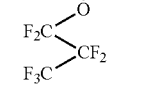

(U4-1)

Production Example 1

Production of Fluorinated Polymer Q1

Inside of a stainless-steel autoclave with a stirrer having an internal volume of 1 L was degassed under reduced pressure, and then, 0.8 g of a perbutyl PV (manufactured by NOF CORPORATION) 50 mass % solution in Asahiklin AK-225G (manufactured by Asahi Glass Co., Ltd.), 48.5 g of $CF_2$=$CFOCF_2CF_2CF_2COOCH_3$ (hereinafter referred to as "MPVB"), 795 g of $CF_2$=$CFOCF_2CF_2CF_3$ (hereinafter referred to as "PPVE") and 39.4 g of Asahiklin AC-2000 (manufactured by Asahi Glass Co., Ltd.) were charged.

Further, 120.3 g of $CF_2=CF_2$ was injected into the autoclave, and then, the internal temperature was raised to 60° C. to carry out polymerization for 4 hours. During this period, 46.4 g of TFE was further fed to keep the pressure in the autoclave at 1.01 MPaG.

Inside of the autoclave was cooled, and the gas was purged, whereupon 600 g of the content was supplied into a glass beaker containing 6 L of hexane. After removing the upper layer of the liquid phase in the glass beaker, the lower layer was heated in vacuo to remove residual monomer components, thereby to obtain 103.3 g of a fluorinated polymer precursor P1. The composition of the fluorinated polymer precursor P1 calculated by $^1$HNMR and $^{19}$FNMR, was (U11):(U2-1):(U3-1)=2:71:27 (molar ratio). The mass average molecular weight was 34,000, and the fluorine atom content was 64 mass %.

26.5 g of the fluorinated polymer precursor P1 was dissolved in 129.1 g of Asahiklin AC-2000, and then 4.0 g of methanol and 0.4 g of a 79 mass % aqueous solution of hydrazine-monohydrate were added, followed by stirring at 40° C. for 2 days. The reaction solution was transferred to a petri dish, preliminarily dried under the atmosphere, and then dried under vacuum at 100° C. for 1 day to obtain a fluorinated polymer Q1. By the IR-measurements before and after the reaction, it was confirmed that the absorption at 1,794 cm$^{-1}$ due to C=O of a —COOCH$_3$ group had almost disappeared by the above reaction, and the absorption at 1,705 cm$^{-1}$ due to C=O of a —CONH— group had newly occurred.

Example 1

2.4 g of a 10 mass % solution of the fluorinated polymer Q1 described in Production Example 1 in Asahiklin AC-2000 was dropwise added to an aluminum dish, and on the coating liquid, 1.1 g of a 1 mass % solution of isophorone diisocyanate (isomer blend, manufactured by Tokyo Chemical Industry Co., Ltd.) in Asahiklin AC-2000 was dropped and dried overnight at room temperature in the atmosphere to obtain a coating film. The obtained coating film was immersed in AC-2000 together with the aluminum dish, whereby the film remained as adhered to the aluminum dish. The refractive index of the coating film, which can be measured by an Abbe refractometer, was as low as 1.34. Further, when the fluorinated polymer Q1 solution and the isophorone diisocyanate solution were dropped onto a poly(ethylene terephthalate) (PET) film under the above conditions and dried overnight at room temperature under the atmospheric air, whereby the PET film remained colorless and transparent, and a transparent resin film having a low reflection surface was obtained.

Example 2

2.3 g of a 10 mass % solution of the fluorinated polymer Q1 described in Production Example 1 in Asahiklin AC-2000 was dropwise added to an aluminum dish, and to the coating solution, 0.01 g of methylenediphenyl 4,4'-diisocyanate (manufactured by Tokyo Chemical Industry Co., Ltd.) was added, followed by stirring, to obtain a gel-like solid. The obtained gel-like solid was further dried at room temperature overnight under the atmosphere to prepare a coating film. When the obtained coating film was immersed in AC-2000 together with the aluminum dish, whereby the coating film was insoluble in AC-2000.

Production Example 2: Production of Fluorinated Polymer Q2

The fluorinated polymer precursor P2 (units (U11) being 100%) being a homopolymer of MPVB, was synthesized by the method described in WO2004/067655. The mass average molecular weight of the fluorinated polymer precursor P2 was 5,000, and the fluorine atom content was 56 mass %. 2.6 g of the fluorinated polymer precursor P2 was dissolved in 11.5 g of Asahiklin AE-3000 (manufactured by Asahi Glass Co., Ltd.), and then, 40.5 g of methanol and 1.6 g of a 79 mass % aqueous solution of hydrazine-monohydrate were added to the mixture, followed by stirring at room temperature for one day. The reaction solution was preliminarily dried under a stream of nitrogen and then dried under vacuum at room temperature for one day to obtain a fluorinated polymer Q2. By the IR-measurements, it was confirmed that the absorption at 1,794 cm$^{-1}$ due to C=O of a —COOCH$_3$ group had almost disappeared by the reaction of the fluorinated polymer precursor P2 and the hydrazine. From this, it can be judged that the —COOCH$_3$ groups in the fluorinated polymer precursor P2 were almost converted to —CONHNH$_2$ groups, and it is considered that the mass average molecular weight of the fluorinated polymer Q2 is 5,000 and the fluorine atom content is 56 mass %. Further, the fluorinated polymer Q2 was soluble in methanol.

Example 3

The fluorinated polymer Q2 described in Production Example 2 was added to Asahiklin AK-225G and then isophorone diisocyanate was added, so that the fluorinated polymer Q2 would be 10 mass % and the isophorone diisocyanate would be 5 mass %, and the mixture was dried at room temperature overnight under the atmosphere to obtain a solid content. The obtained solid content was insoluble in both methanol and Asahiklin AK-225G.

Production Example 3: Production of Fluorinated Polymer Q3

$C(CF_2O(CF_2CF_2O)_kCF_2COF)_4$ was synthesized by the method described in Japanese Patent No. 5,028,801, esterified by addition of ethanol and then dried in vacuo to obtain a fluorinated polymer precursor P3 [$C(CF_2O(CF_2CF_2O)_kCF_2COOC_2H_5)_4$]. The mass average molecular weight of the fluorinated polymer precursor P3 was 4,000. 2.1 g of the fluorinated polymer precursors P3 was dissolved in 16.3 g of Asahiklin AE-3000, and then, 2.8 g of methanol and 0.4 g of a 79 mass % aqueous solution of hydrazine-monohydrate were added, followed by stirring at room temperature for one day. The reaction solution was preliminarily dried under a stream of nitrogen and then dried under vacuum at room temperature for one day to obtain a fluorinated polymer Q3. By the IR-measurements, it was confirmed that the absorption near 1,800 cm$^{-1}$ due to C=O of a —COOC$_2$H$_5$ group had almost disappeared, and the absorption near 1,700 cm$^{-1}$ due to C=O of a —CONH— group had newly occurred. The fluorinated polymer Q3 was soluble in methanol. The fluorine atom content of the fluorinated polymer Q3 was 61 mass %.

Example 4

The fluorinated polymer Q3 described in Production Example 3 was added to Asahiklin AK-225G and then isophorone diisocyanate was added, so that the fluorinated polymer Q3 would be 10 mass % and the isophorone diisocyanate would be 5 mass %, followed by drying overnight at room temperature in the atmosphere to obtain a solid content. The obtained solid content was insoluble in both methanol and Asahiklin AK-225G.

Comparative Example 1

In accordance with Synthetic Example 1 in WO2009/096342, a fluorinated polymer X was prepared in which the ratio of units (U2-1), units (U4-1) and units (U3-1) was 67:7:26 (molar ratio). Next, a Asahiklin AC-2000 solution containing 15 mass % of the fluorinated polymer X was prepared, and this solution was heated on a hot plate at 40° C. for 1 hour and then at 60° C. for 1 hour. Asahiklin AC-2000 was volatilized by the heating, but the fluorinated polymer X did not thermally crosslink and was dissolved when re-immersed in Asahiklin AC-2000.

Comparative Example 2

Even when the fluorinated polymer precursor P1 described in Production Example 1 was heated at 160° C. overnight in a vacuumed oven, the IR spectrum remained unchanged before and after heating, and the fluorinated polymer precursor P1 was dissolved in Asahiklin AC-2000 after the heating. However, the fluorinated polymer precursor P1 was hot-pressed at 80° C. to obtain a transparent film. This transparent film was irradiated with ultraviolet rays for 2 hours under a nitrogen atmosphere by a 200 W low-pressure mercury lamp, and then the transparent film was flipped over and irradiated with ultraviolet rays for another 2 hours, whereby a cured film without foaming was obtained. By the IR-measurements, it was confirmed that the absorption at 1,794 cm$^{-1}$ due to C=O of a —COOCH$_3$ group had almost disappeared by the UV-irradiation. The refractive index of the cured film, which can be measured by an Abbe refractometer, was as low as 1.33. However, when Asahiklin AC-2000 containing 10 mass % of the fluorinated polymer precursor P1 was dropped onto a PET film, dried at room temperature overnight in the atmospheric air and then irradiated with ultraviolet rays by using a low-pressure mercury lamp under the same conditions as described above, the PET film was colored and deformed.

Comparative Example 3

Even when the fluorinated polymer Q1 described in Production Example 1 was hot-pressed at 160° C. for 3 hours, the IR spectrum did not change before and after the hot-pressing, and the obtained transparent press film was dissolved in Asahiklin AC-2000. When the transparent pressed film of the fluorinated polymer Q1 was heated at 200° C. for 3 days and 260° C. for 5 hours in a nitrogen atmosphere, a cured film without foaming was obtained. The refractive index of the cured film, which can be measured by an Abbe refractometer, was as low as 1.33. However, when Asahiklin AC-2000 containing 10 mass % of the fluorinated polymer Q1 was dropped onto a PET film, dried at room temperature overnight in the atmospheric air and heated under the same conditions as described above, the PET film was colored and deformed.

Comparative Example 4

The same operation as in Example 1 was carried out except that butyl isocyanate was used instead of isophorone diisocyanate. When the obtained coating film was immersed in AC-2000 together with the aluminum dish, the coating film was eluted.

Example 5

3.3 g of a 15 mass % solution of the fluorinated polymer Q1 described in Production Example 1 in Asahiklin AC-2000 was put in a 10 ml container containing a stirrer tip. Then, 0.98 g of a 1 mass % solution of phenyl isocyanate in Asahiklin AC-2000 was added, followed by stirring for 1 hour at room temperature using a magnetic stirrer. Then, ion-exchanged water was dropwise added until no bubbles were generated, and then 2-propanol in the same volume as the reaction solution was added to precipitate a gel-like polymer. The precipitate was washed with an excess amount of hexane and dried under a stream of nitrogen for 2 hours, at 80° C. under vacuum for 3 hours and at room temperature under vacuum overnight. The dried polymer was dissolved in Asahiklin AC-2000 to prepare its 10 mass % solution. This was put in a dish-like container made of Aflex® (a fluororesin film manufactured by Asahi Glass Co., Ltd.) and dried at 25° C. under a stream of nitrogen for 2 hours and at 80° C. under vacuum for 3 hours. Further, it was heated at 180° C. for 3 hours under a stream of nitrogen, whereby it became insoluble in Asahiklin AC-2000. When the IR spectra before and after the heating at 180° C. were compared, the peaks in the vicinity of 1,690 cm$^{-1}$ and 2,860 cm$^{-1}$ had disappeared, and the peaks in the vicinity of 2,940 cm$^{-1}$ and 3,270 cm$^{-1}$ had decreased. From this fact, it is considered that the low molecular components were eliminated from the periphery of the urea bonds once formed, and the remaining high molecular components were crosslinked by new bonds.

Example 6

To 0.16 g of a 100 times acetone-diluted solution of a catalyst (manufactured by Daiei Sangyo Kaisha, Ltd.) used for an oxime block polyisocyanate solution (diluting solvent: acetone, NCO equivalent weight: 7.0%, Blonate PMD-OA02 manufactured by Daiei Sangyo Kaisha, Ltd.), 20.9 g of a 10 mass % solution of the fluorinated polymer Q1 described in Production Example 1 in Asahiklin AC-2000 was added, and finally, 0.18 g of the oxime block polyisocyanate solution was added to prepare a mixed solution. The mixed solution was then spread into a polytetrafluoroethylene dish. After being left to stand still at room temperature overnight, it was heated in an air blowing oven at 120° C. for 30 minutes to obtain a coating film. The obtained coating film was insoluble in Asahiklin AC-2000.

Examples 7 to 12

The same operation as in Example 1 was carried out to obtain a sheet having a coating layer, except that instead of the PET film, a sheet made of an epoxy resin (EpoCure 2, manufactured by Buehler), a sheet made of polydimethylsiloxane (Silgard (registered trademark) 184 manufactured by Dow Corning Toray Co., Ltd.), a silicone rubber sheet ("Silicone Rubber Sheet", sold by AS ONE Corporation), a polyurethane sheet ("Anti-slip Double-Sided Adsorption Sheet", sold by Daiso Industries Co., Ltd.), a sheet made of a vinylidene fluoride/tetrafluoroethylene/hexafluoropropylene copolymer fluororubber (DAI-EL (registered trademark) G-901, manufactured by Daikin Industries Ltd.), or a sheet made of a tetrafluoroethylene/propylene copolymer fluororubber (Aflas (registered trademark) 600S, manufactured by Asahi Glass Co., Ltd.) was used. Each sheet retained the same appearance as before forming the coating.

Comparative Examples 5 to 8

The same operation as in Comparative Example 2 was carried out, except that instead of the PET film, a sheet made of an epoxy resin (EpoCure 2, manufactured by Buehler), a polyurethane sheet ("Anti-slip Double-Sided Adsorption Sheet", sold by Daiso Industries Co., Ltd.), a sheet made of a vinylidene fluoride/tetrafluoroethylene/hexafluoropropylene copolymer fluororubber (DAI-EL (registered trademark) G-901, manufactured by Daikin Industries Ltd.), or a sheet made of tetrafluoroethylene/propylene copolymer fluororubber (Aflas (registered trademark) 600S, manufactured by Asahi Glass Co., Ltd.) was used. Each sheet was colored by UV irradiation.

Comparative Examples 9 and 10

The same operation as in Comparative Example 2 was carried out, except that instead of the PET film, a silicone rubber sheet (silicon rubber sheet sold by AS ONE Corporation) or a sheet made of polydimethylsiloxane (Silgard (registered trademark) 184 manufactured by Dow Corning Toray Co., Ltd.) was used. Each sheet thus obtained had cracks in the vicinity of the surface after being bent by 90 degrees.

This application is a continuation of PCT Application No. PCT/JP2018/005276, filed on Feb. 15, 2018, which is based upon and claims the benefit of priority from Japanese Patent Application No. 2017-041256 filed on Mar. 6, 2017. The contents of those applications are incorporated herein by reference in their entireties.

What is claimed is:

1. A curable composition characterized by comprising a fluorinated polymer containing at least three functional groups represented by the following formula (F), and at least one curing agent selected from the group consisting of an isocyanate-type curing agent, a blocked isocyanate-type curing agent and an amino resin-type curing agent:

—R$^{f1}$COZ$^1$ (F)

(in the formula (F), R$^{f1}$ is a fluoroalkylene group, or a fluoroalkylene group with at least two carbon atoms having an etheric oxygen atom between carbon-carbon atoms, Z$^1$ is NR$^1$NR$^2$H or NR$^3$OR$^4$, and R$^1$, R$^2$, R$^3$ and R$^4$ are each independently a hydrogen atom or an alkyl group.)

2. The curable composition according to claim 1, wherein the fluorinated polymer contains a unit represented by the following formula (U1), and contains at least one functional group represented by the formula (F) in the unit represented by the formula (U1):

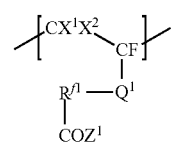

(in the formula (U1), X$^1$ and X$^2$ are each independently a hydrogen atom or a fluorine atom, Q$^1$ is a single bond or an etheric oxygen atom, R$^{f1}$ is a fluoroalkylene group, or a fluoroalkylene group with at least two carbon atoms having an etheric oxygen atom between carbon-carbon atoms, Z$^1$ is NR$^1$NR$^2$H or NR$^3$OR$^4$, and R$^1$, R$^2$, R$^3$ and R$^4$ are each independently a hydrogen atom or an alkyl group.)

3. The curable composition according to claim 2, wherein the fluorinated polymer contains at least three units represented by the formula (U1).

4. The curable composition according to claim 1, wherein the fluorinated polymer contains at least three groups represented by the following formula (F1):

—(R$^{f2}$O)$_k$—R$^{f1}$COZ$^1$ (F1)

(in the formula (F1), R$^{f2}$ is a C$_{1-4}$ perfluoroalkylene group; k is an integer of from 1 to 200; R$^{f1}$ is a fluoroalkylene group, or a fluoroalkylene group with at least two carbon atoms having an etheric oxygen atom between carbon-carbon atoms; Z$^1$ is NR$^1$NR$^2$H or NR$^3$OR$^4$; and R$^1$, R$^2$, R$^3$ and R$^4$ are each independently a hydrogen atom or an alkyl group.)

5. The curable composition according to claim 4, wherein the fluorinated polymer is a compound in which three or four groups represented by the formula (F1) are bonded to one carbon atom.

6. The curable composition according to claim 1, wherein the amount of fluorine atoms contained in the fluorinated polymer is from 50 to 76 mass %.

7. The curable composition according to claim 1, wherein the content of the curing agent (B) is from 0.1 to 100 parts by mass to 100 parts by mass of the fluorinated polymer (A).

8. A coating material comprising the curable composition as defined in claim 1 and a liquid having a boiling point of at most 250° C.

9. An electric wire comprising a conductor wire and a covering layer covering the outer periphery of the conductor wire, wherein the covering layer is made of a cured product of the curable composition as defined in claim 1.

10. A resin article comprising a resin substrate and a covering layer covering the surface of the resin substrate, wherein the covering layer is made of a cured product of the curable composition as defined in claim 1.

11. The resin article according to claim 10, wherein the resin substrate is a transparent polyester, an epoxy resin, a transparent silicone resin, a polyurethane resin, a silicone rubber, a polyurethane rubber, or a fluororubber.

* * * * *